Figure 1:
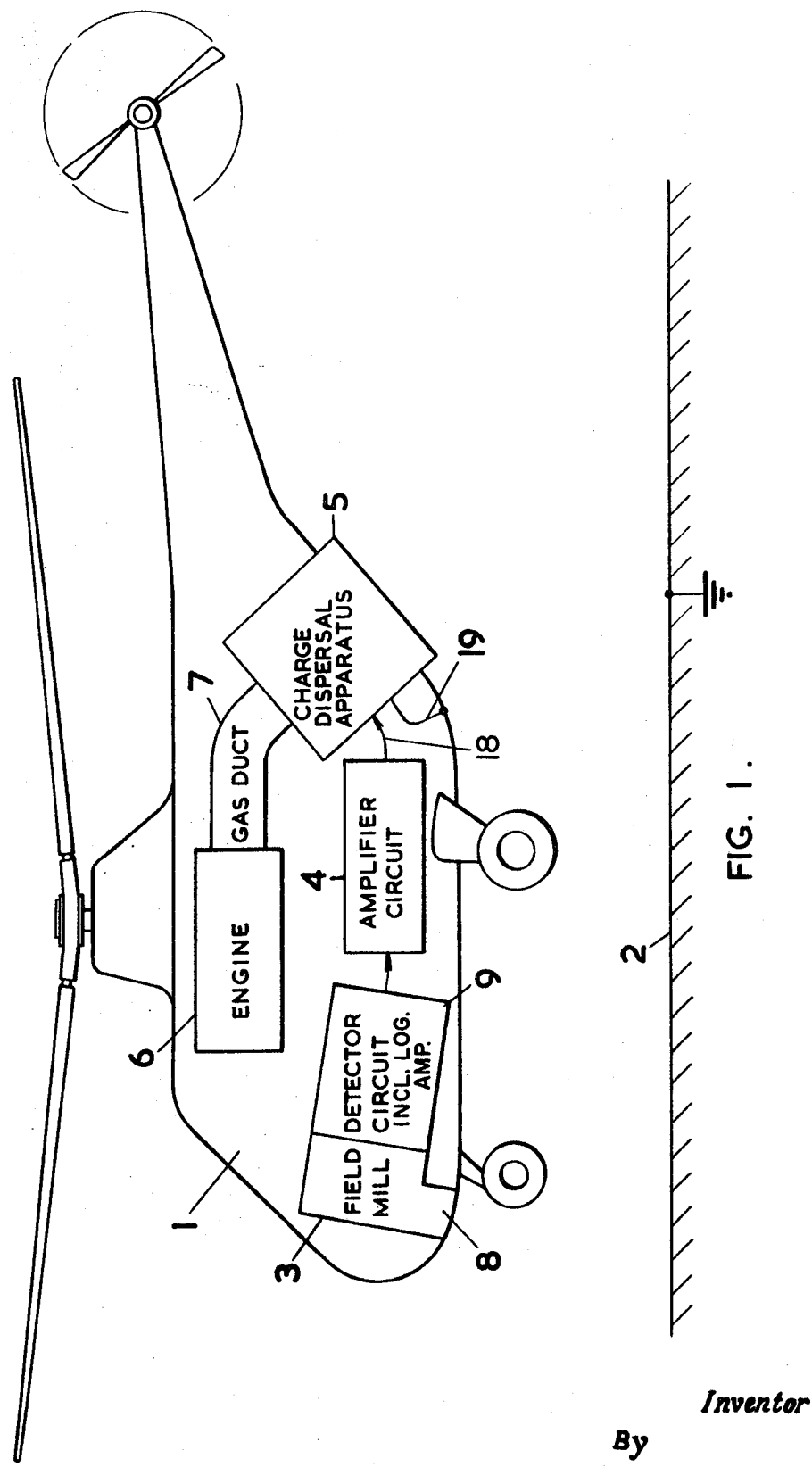

United States Patent

[11] 3,600,632

[72] Inventors: Alfred William Bright, Southampton; Brian Makin, Botley; Michael Edward Rogers, Frimley; Bruce Robert Whewell, London, all of, England
[21] Appl. No. 881,428
[22] Filed Dec. 2, 1969
[45] Patented Aug. 17, 1971
[73] Assignee Minister of Technology in Her Britannic Majesty's Government of the United Kingdom of Great Britain and Northern Ireland, London, England
[32] Priority Dec. 3, 1968, Nov. 12, 1969
[33] Great Britain
[31] 57433/68 and 55380/69

[54] STATIC ELECTRICITY DISHCARGE SYSTEMS
7 Claims, 3 Drawing Figs.
[52] U.S. Cl. .................................................... 317/2, 317/4, 323/22, 340/27
[51] Int. Cl. .................................................... H05f 3/06
[50] Field of Search .......................................... 317/262, 2, 2.4, 3, 4, 2.5; 324/32; 244/1 R

[56] References Cited
UNITED STATES PATENTS
2,539,163   1/1951   Robinson .................... 317/2
2,578,697   12/1951  Gunn ........................... 317/2
3,260,893   7/1966   Cievva et al. ................ 317/2
3,308,344   3/1967   Smith et al. .................. 317/4 X
3,317,790   5/1967   Whitby ........................ 317/2 X Primary Examiner—Milton O. Hirshfield
Assistant Examiner—W. Weldon
Attorney—Cameron, Kerkam & Sutton ABSTRACT: Equipment for discharging static electricity from a structure comprises a transducer for measuring the magnitude and polarity of any electrostatic field developed at the surface of the structure, and charge-dispersal apparatus controlled thereby for ejecting electric charges in or on a stream of solid or liquid or frozen liquid particles of greater inertia than atmospheric gas ions. The particles may be formed by condensation in a fast-moving stream of vapor-containing gas. The gas stream may be formed in a duct having a throat and a widening expansion section downstream from the throat constructed so that the gas reached sonic speed at the throat and a speed from 1.3 to 2 times sonic speed in the expansion section. A voltage controlled by the transducer is applied to electrodes in the duct to cause a corona discharge in the gas stream. The invention may be used in aircraft, especially helicopters, and the gas stream may be provided through a duct from an engine of the aircraft.

STATIC ELECTRICITY DISHCARGE SYSTEMS

The present invention relates to static electricity discharger systems, and more particularly relates to improvements in systems for sensing and discharging electrostatic charges accumulated on fixed-wing aircraft or on rotary-wing aircraft (for instance, helicopters). However, the invention may also be applied to dissipate or reduce static charge accumulation on articles, apparatus or vehicles other than aircraft.

It is known that the operation of an aircraft often tends to cause an accumulation of electrostatic charges through various effects, which are discussed for example in U.K. Pat. No. 1,066,530. Such accumulations of static charges can be dangerous, especially in the case of hovering aircraft engaged in cargo-handling or rescue operations, and may also cause corona discharges which may interfere with radio communications.

Previous systems for discharging electrostatic charges from aircraft have involved passive corona discharge points, which are insufficiently effective to ensure a desired degree of safety in all conditions, or an active discharger system which senses the accumulated charge and causes compensating discharges by applying a controlled very high voltage (typically 100 kilovolts or 200 kilovolts) to some corona discharge points projecting from chosen sites on the aircraft. In the latter system it is difficult to provide sufficient discharge current without creating strong and fairly extensive electrostatic fields between the corona point and the aircraft structure. Such fields tend to pull the ejected charges back on to the aircraft structure, thereby making a considerable proportion of them ineffective for their required purpose.

According to the present invention there is provided a static electricity discharger system, including a transducer for providing a signal or signals indicative of the magnitude and polarity of any electrostatic field gradient developed at a surface of a structure, and charge-dispersal apparatus responsive to the said signal or signals for ejecting electrical charges from the structure in or on a stream of particles having greater inertia than ions of atmospheric gases, so as to reduce the said electrostatic field gradient.

The term "particles" should hereinafter be understood to means "particles of solid or liquid or frozen liquid matter having considerably greater inertia and lower mobilities than ions of atmospheric gases." The ejected particles are preferably liquid or frozen droplets formed by causing the condensation of a vapor, for instance water vapor, in a supersonic stream of air or other gases. Hence the discharger means preferably includes means for providing a stream of air or other gas or gases traveling at or near the speed of sound, charge injection means for injecting electric charges into the said stream by a corona discharge, and expansion means for making the said stream expand sufficiently to become supersonic and to cause condensation of vapors therein, forming particles which will carry electrical charges away from the structure. Where the invention is applied to an aircraft, the discharger means is preferably mounted so that the slipstream or downdraft of the aircraft will help to carry the charged particles away from the aircraft. The gas stream may be provided by a duct from some part of the aircraft engine, especially if it is a gas turbine engine, and it may possibly comprise air, and air and fuel mixture, a partially burnt air and fuel mixture, or exhaust gases for instance. The duct may taper down to a throat designed so that the gas flow will reach the speed of sound at the throat. The injection means may include at least one sharp-pointed or sharp-edged electrode mounted with its point in the duct near, within or downstream of the throat, another electrode which may form a part of the duct wall or a structure within the duct, and means for applying a sufficient voltage between the other electrode and the sharp electrode to cause a corona discharge from its sharp point or edge. The system may be required to eject either positive or negative charges from the discharge around the point or edge. Either the sharp electrode or the other electrode, may be connected to the airframe. With respect to the other electrode may be connected to the airframe. With respect to the other electrode, the sharp electrode must have the polarity which it is required to discharge. The other electrode should be smooth, with no sharp edges or points. The expansion means may comprise a widening part or enlargement of the duct downstream from the throat, which may be designed to increase the speed of the gas flow to a speed in the range from about 1.3 to about two times the speed of sound. This expansion involves an adiabatic cooling of the gas. The discharger should be operated so that this cooling causes the condensation of liquid droplets or frozen particles or both from a vapor or vapors carried in the gas stream. It is thought that the condensation may take place preferentially around ions formed in the corona discharge, and that ions formed by the discharge are caught up and swept away among or by the droplets or particles formed in the gas stream. The electrostatic field of the charge-injection means is comparatively localized and the speed of the gas stream comparatively high so that it very quickly carries the charges out of the region in which the field of the charge-injection means predominates.

The electric charges in ordinary corona discharges are carried mainly by ions of atmospheric gases. Such ions have a comparatively high mobility and electrostatic forces can comparatively easily draw them transversely out of any gas stream. Ejected charge carriers which escape from the gas stream, will tend to be drawn back towards the other electrode of the injection means by the voltage applied to it. Charge carriers actually drawn back to any part of the aircraft will have no discharging effect and constitute a wasted and abortive current. However, when the charges are collected on particles which have comparatively high inertia and which have already acquired a high velocity as a part of the gas stream, because of the lower mobility and high inertia of the particles the charges are less likely to escape transversely from the gas stream in the vicinity of the duct throat. Hence a smaller proportion of the charge injected into the gas stream manages to reach the duct walls or otherwise return to the aircraft. The efficiency of charge dispersal of the present discharger means appears to be considerably increased relative to that of the simple corona discharge arrangements heretofore used, not only by the use of a high-speed gas stream which rapidly sweeps the ejected charges out of the region in which the charge-injection field predominates, but also by causing the charge carriers to be entrapped and swept away by or among a stream of particles having low mobilities which tend to prevent or at least delay any escape of charge carriers from the gas stream.

The preferred method for providing particles of suitable inertia and velocity is to create them by condensation in a fast-moving gas stream. For the greatest efficiency it appears desirable to inject the electric charges directly into the area where the particles are formed. The charges are preferably injected by a corona discharge. Ions or free electrons provided by the corona discharge may then act as centers of condensation as hereinbefore mentioned. Clearly a plurality of sharp electrodes, for instance needle points, may be used in one duct or in several ducts to provide the desired maximum rate of charge dispersal.

Figure 2:
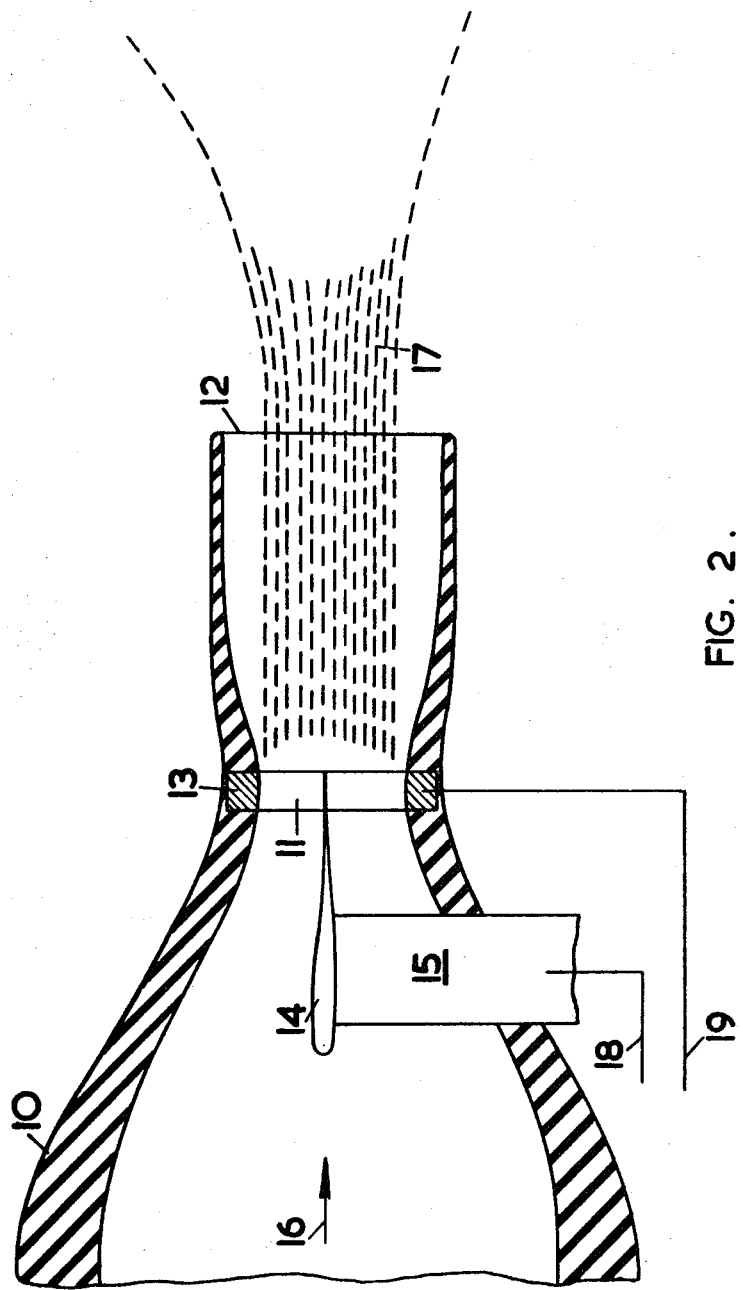
Figure 3:
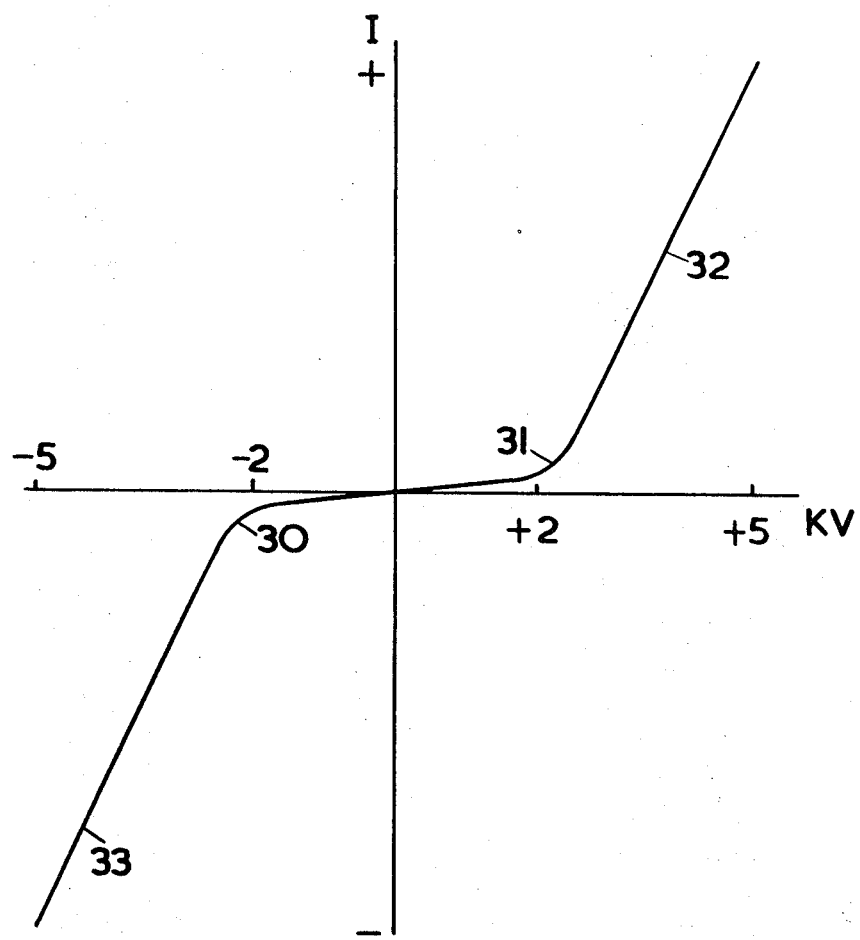

Some embodiments of charge dispersal apparatus of the type herein described are more efficient than previously known aircraft static dischargers and therefore allow the maximum empirically necessary net discharge rate to be attained with a corona discharge voltage much lower than that used in previously known active discharger systems. One embodiment will now be described, by way of example only, with reference to the accompanying drawings, of which:

FIG. 1 is a schematic diagram showing a static electricity discharger system in a hovering helicopter, FIG. 2 is a sectioned diagrammatic drawing of a charge dispersal apparatus for use in the system of FIG. 1, and FIG. 3 is a graphical diagram showing characteristics of a corona discharge such as is used in the apparatus of FIG. 2.

FIG. 1 shows diagrammatically a helicopter 1 hovering above the ground 2. A discharger system installed in the helicopter 1 includes a field sensing means 3, an amplifier circuit 4, and a charge dispersal apparatus 5. The helicopter 1 has a gas turbine engine 6 which is connected to the charge dispersal apparatus 5 by a gas duct 7.

In the operation of the helicopter, triboelectric and other effects tend to cause the development and accumulation of electrostatic charges on the helicopter. These charges, which may be either polarity, develop and electrostatic field between the helicopter 1 and the ground 2. In some conditions (for instance, underneath a thunder cloud) there may also be a natural atmospheric electrostatic field, which will be superimposed on and will be modified by the field of the charges accumulated on the helicopter. The purpose of the discharger system is to keep the resultant electrostatic field between the helicopter 1 and the ground 2 as far as possible down to a level considered safe for cargo-handling and rescue operations.

The field sensing means 3 is installed so that it is exposed to the aforesaid electrostatic field, in a position chosen to avoid as far as practicable any screening from the field by any undercarriage or other structure carried by the helicopter, and it may have to be screened from or sited remotely from any radio transmitting antennae on the helicopter. It includes a rotating-vane electrometer, known as field mill 8, and a detector circuit 9. The field mill 8 produces an alternating signal current of amplitude dependent on the electrostatic field gradient at the position of the field mill. From this signal, the detector circuit 9 derives a direct-current signal whose polarity and magnitude are dependent on the polarity and magnitude respectively of the field gradient at the field mill. The structure of a field mill, the theory of its operation, and examples of suitable detector circuits for use with it have been used in the prior art and are described, for instance, by Mapleson and Whitlock in the Journal of Atmospheric and Terrestrial Physics, 1955, Vol 7 pages 61—72. The detector circuit may include a phase-sensitive rectifier circuit (not shown) fed with a reference signal from the field mill 8. The direct-current signal form the detector circuit 9 is amplified by the amplifier circuit 4 and is used to control a discharger voltage applied to the charge dispersal apparatus 5.

FIG. 2 shows in section a typical part of the charge dispersal apparatus 5. It comprises a polytetrafluoroethylene tube 10 which tapers to a throat 11 and then widens out to form a nozzle 12. An annular metallic electrode 13 is incorporated in and forms a part of the internal surface of the tube 10 in or near the throat 11. A needlelike electrode 14 is mounted substantially on the longitudinal axis of the tube, with its point at or near the center of the throat 11. The electrode 14 is mounted on a fin-shaped support 15 which is electrically insulated from the electrode 13. The tube 10 is connected to the gas duct 7 of FIG. 1 so that it will receive a high-speed stream of gas containing vapor, which is symbolized in FIG. 2 by an arrow 16. The nozzle 12 discharges into the atmosphere at atmospheric pressure, but the gas 16 from the duct 7 will be at a pressure probably of the order of 100 pounds per square inch, so that the gas flow will reach the speed of sound at the throat 11, and will be supersonic between the throat 11 and the nozzle 12. Adiabatic cooling caused by the gas expansion in this region produces condensation symbolized in FIG. 2 by the broken lines 17. The discharger voltage from the amplifier circuit 4 (of FIG. 1) is applied between the needle electrode 14 and the annular electrode 13 by connections symbolized by lines 18, 19, and causes a corona discharge from the point of the needle electrode 14.

The throat 11 will be typically about 2 or 3 millimeters in diameter, and a plurality (for instance about four) tubes as shown in FIG. 2 may be connected in parallel to make up the charge dispersal apparatus 5 of FIG. 1. Their nozzles should project from the helicopter so as to discharge into the downdraft of its rotor at a position well clear of any structure attached to the helicopter and screened from any radio antennae mounted thereon. Particular care should be taken to ensure that the chance of any particles dispersed from the nozzles returning to the sensitive area of the field mill 3 is remote, to avoid instability and inefficiency.

The discharger system controls the magnitude and polarity of the discharger voltage according to the magnitude and polarity of the electrostatic field gradient measured by the field mill 3, so that the average rate of charge dispersal from the nozzles of the apparatus 5 substantially balances the combined effect of all other charging and discharging processes. The whole arrangement forms a servosystem ending to keep the electrostatic field gradient at the surface of the helicopter at a detectable, but tolerable level. As in all other servosystems care must be taken to ensure stable and satisfactory operation in all probable conditions of use, particularly in relation to the design of the amplifier and in relation to any feedback paths and phase-shifting networks which may be formed in the system. It should be noted that the field may have either polarity and hence it must be possible to provide either a positive or a negative discharger voltage to achieve the desired balance on all occasions. When the system is operating in normal conditions, it should generally limit the maximum field gradient around the helicopter so that the amplitude of the signal output from the sensor in the detector circuit 9 may vary over a 50 to one range. However, in abnormal conditions (for instance in the vicinity of a lightning stroke) the sensor output signal may rise to the order of 200 times its largest normal amplitude and the system should be arranged to tolerate and recover from such inputs. For this reason, the detector 9 may include a limiting or nonlinear (e.g. logarithmic) amplifier. The total discharge current may be required to rise to about 200 microamperes in bad weather conditions, and the discharger voltage will probably have to be variable over a range from minus 5 kilovolts to plus 5 kilovolts, at least.

FIG. 3 shows qualitatively the current-voltage characteristic of a typical corona discharge, such as is used in the operation of the apparatus of FIG. 2. This has a considerable nonlinearity which in effect reduces the loop gain of the discharger system for small signals, that is to say in comparatively weak electrostatic fields. It is however considered desirable that the discharger system should be sensitive enough to respond satisfactorily to conditions requiring comparatively low discharge currents such as are represented by points in the region of the bends 30, 31 of the characteristic shown in FIG. 3. In these circumstances it may be a desirable modification to provide an automatic gain control on the amplifier 4, responsive to the discharger current and connected to reduce the gain of the amplifier circuit 4 when the discharge is operating on either of the steeper linear portions 32, 33 of the characteristic of FIG. 3. This may be arranged, for instance, by including a resistor (not shown) in series with the line 19 (FIG. 2) and applying the voltage developed across this resistor to a conventional automatic gain control circuit in the amplifier circuit 4.

Since the amplifier circuit 4 will be required to provide discharger voltages probably over the range from minus 5 kilovolts to plus 5 kilovolts or more, it may be convenient to construct it as a pair of amplifiers or as an amplifier with a pair of output stages connected to operate alternatively, one acting when positive discharges are required and the other acting when negative discharges are needed. Polarity-responsive polarity-switching circuits may be incorporated. Alternatively, circuits as described in the U.K. Pat. No. 1,066,530 should be suitable if the voltage multiplier networks therein used are omitted or suitably simplified to give the lower discharger voltages required by the charge dispersal apparatus hereinbefore described. Separate dischargers may be used for discharges of different polarities. The polarity and the magnitude of the discharge current required may be indicated by separate signals derived from the sensing means 3.

The optimum positions of the needle electrode 14 and the annular electrode 13 in relation to each other and in relation to the throat 11 are not necessarily as shown in FIG. 2. The shape and proportions of the tube 10 which are shown in FIG. 2 are not necessarily preferable, and it should be obvious that the shape, material, proportions and relative positions of these parts may be considerably varied within the scope of the present invention. For instance the electrode 14 may be formed as a sharp-edged arrowhead or fin structure. The onset of condensation does not necessarily or preferably occur at the positions indicated by the ends of the broken lines 17 in FIG. 2; indeed it would probably be better to have the onset of condensation occuring nearer to the point of the needle electrode 14. Arrangements may be provided for increasing the humidity of the gas in the duct 7, or adding further quantities of vapor, or particulate additives to it, or for adjusting its temperature, to achieve optimum conditions for the operation of the charge dispersal apparatus. The line 19 of FIG. 2 will probably be connected to the airframe, that is the main metallic structure of the helicopter as is indicated by line 19 on FIG. 1.

While the invention has been described with reference to the discharging of aircraft, it is clearly equally applicable to the compensation of static charges on other structures or apparatus. For instance it could be applied to road or railroad tanker vehicles used for the conveyance of flammable or explosive substances.

We claim:

1. A system for discharging undesirable static electricity from a structure, comprising transducer means for providing a signal or signals indicative of the magnitude and polarity of any electrostatic field gradient developed at the surface of the structure, means for providing a stream of vapor-containing gas travelling at or near the speed of sound, charge injection means for injecting electric charges into the said stream by a corona discharge, and expansion means for making the said stream expand sufficiently to cause condensation of vapor therein, so as to form particles or droplets in the stream having greater inertia than ions of atmospheric gases, the said charge injection means being connected to the said transducer means and responsive to the said signal or signals for controlling the ejection of electrical charges from the structure in or on the said stream so as to reduce the said electrostatic field gradient.

2. A system as claimed in claim 1 wherein the said means for providing the said stream of gas comprises a duct for leading said stream of gas from a gas turbine engine to said charge injection means.

3. A system as claimed in claim 1 and wherein the said means for providing the said stream of gas comprises a duct which tapers to a throat and is constructed so that in operation the said stream of gas will reach the speed of sound within the throat of the said duct.

4. A system as claimed in claim 3 and wherein the said expansion means comprises a widening expansion section of the said duct downstream from the throat thereof, constructed so that when the said stream of gas reaches the speed of sound within the throat of the duct, it will reach a speed in the range from 1.3 times the speed of sound to twice the speed of sound within the said expansion section.

5. A system as claimed in claim 3 and wherein the said charge injection means comprises at least one sharp-pointed electrode mounted with its point within the duct, another electrode insulated from the said at least one sharp-pointed electrode, and means for applying a voltage between the other electrode and the sharp-pointed electrode sufficient for causing a corona discharge from the said point and within the said stream of gas, the said voltage being controlled according to the said signal or signals indicative of the magnitude and polarity of the said electrostatic field gradient.

6. A system as claimed in claim 3 and wherein the said charge injection means comprises at least one sharp-edged electrode mounted with a sharp edge within the duct, another electrode insulated from the said at least one sharp-edged electrode, and means for applying a voltage between the other electrode and the sharp-edged electrode sufficient for causing a corona discharge from the said sharp edge within the said stream of gas, the said voltage being controlled according to the said signal or signals indicative of the magnitude and polarity of the said electrostatic field gradient.

7. A system as claimed in claim 1 and wherein the said transducer means comprises a rotating-vane electrometer and a detector circuit incorporating a logarithmic amplifier.